US008594268B2

(12) United States Patent
Shu (10) Patent No.: US 8,594,268 B2
(45) Date of Patent: Nov. 26, 2013

(54) TWO-FLUID MOLTEN-SALT REACTOR (75) Inventor: Frank H. Shu, Solana Beach, CA (US)

(73) Assignees: Frank H. Shu, Solana Beach, FL (US); Academia Sinica, Taipei (TW)

( * ) Notice: Subject to any disclaimer, the term of this patent is extended or adjusted under 35 U.S.C. 154(b) by 0 days.

(21) Appl. No.: 13/290,711

(22) Filed: Nov. 7, 2011

(65) Prior Publication Data
US 2012/0051481 A1    Mar. 1, 2012

Related U.S. Application Data

(63) Continuation of application No. PCT/US2010/033979, filed on May 7, 2010.

(60) Provisional application No. 61/176,512, filed on May 8, 2009.

(51) Int. Cl.
*G21C 15/00* (2006.01)

(52) U.S. Cl.
USPC ............ 376/403; 376/347; 376/361; 376/402

(58) Field of Classification Search
USPC ......... 376/156, 158, 170, 171, 174, 347, 354, 376/359, 360, 361, 402, 403, 404, 405
See application file for complete search history.

(56) References Cited

U.S. PATENT DOCUMENTS 3,262,856 A * 7/1966 Bettis ............................ 376/171

FOREIGN PATENT DOCUMENTS

GB        856946 A    12/1960

OTHER PUBLICATIONS

Kasten, R., Bettis, E.S., Robertson, Roy C., "Design Studies of 1000-Mw(e) Molten Salt Breeder Reactors," Aug. 1966, ORNL-3996, U.S. Atomic Energy Commission.*
Kasten, R. , Bettis, E.S., Robertson, Roy C., "Design Studies of 1000-Mw(e) Molten Salt Breeder Reactors," ORNL-3996, U.S. Atomic Energy Commission.
Heuer, Matheiu L, D., Brissot, R., Le Brun, C., Liatard, E., Loiseaux, J.M., Meplan, O., Merle-Lucotte, Nuttin, A., Wilson, J. 2005, "The Thorium Molten Salt Reactor: Moving on from the MSBR," arXiv:nucl-ex/050600v1.
MacPherson, H.G., "The Molten Salt Adventure," Nuclear Science and Engineering, 90, pp. 374-380, 1985.
Ponslet, E. Biehl, F., Romero, E.,"Carbon-Carbon Composite Close-out Frames for Space Qualified, Stable, High Thermal Conductivity Support Structures, Hytec Corp.," Report 102021-0001, May 30, 2000.
Rosenhow, R.M., Hartnett, J.P., and Cho, Y.I. "Handbook of Heat Transfer" Third Edition, New York; McGraw Hill, 1998; Chapter 5, "Forced Convection, Internal Flow in Ducts", by M.A. Ebadian and Z.F. Dong, pp. 5.1 to 5.67.

(Continued)

*Primary Examiner* — Jack W Keith
*Assistant Examiner* — Marshall O'Connor
(74) *Attorney, Agent, or Firm* — Brinks Gilson & Lione (57) ABSTRACT

A reactor vessel includes a plenum and a reactor core with first and second sets of channels. A blanket salt flows through the first set of channels, and a fuel salt flows through the second set of channels. The plenum receives the blanket salt from the first set of channels. The blanket salt provides a breed-stock for a fission reaction in the fuel salt and transfers heat generated by the fission reaction without mixing with the fuel salt.

15 Claims, 8 Drawing Sheets

(56) References Cited

OTHER PUBLICATIONS

Rosenthal, M.W., Briggs, R.B., Kasten, P.R., "Molten-Salt Reactor Program Semiannual Progress Report," (for period ending Aug. 31, 1967), Jul. 1967, ORNL-4119, U.S. Atomic Energy Commission.

Scott, D., Eatherly, W.P. "Graphite and Xenon Behavior and Their Influence on Molten Salt Reactor Design," Nuclear Applications and Technology, vol. 8, Feb. 1970, pp. 179-189.

International Search Report from corresponding PCT application No. PCT/US2010/033979, dated May 7, 2010, 7 pgs.

International Report on Patentability from corresponding PCT application No. PCT/US2010/033979, dated May 8, 2010, 7 pgs.

\* cited by examiner

TWO-FLUID MOLTEN-SALT REACTOR

RELATED APPLICATION

This application is a continuation application of PCT/US2010/033979, filed May 7, 2010, which claims priority to U.S. provisional 61/176,512, filed May 8, 2009, the entire contents of which are incorporated herein by reference.

FIELD

The present invention relates to nuclear reactors. More specifically, the invention relates to two-fluid molten-salt reactors.

BACKGROUND

The background description provided herein is for the purpose of generally presenting the context of the disclosure and may not constitute prior art.

Conventional light-water reactors (LWRs) operate on a once-through cycle by burning uranium enriched in a rare isotope U-235 relative to the more abundant U-238. The LWRs use water as coolant to carry away the heat of the fission reactions. This arrangement, however, (1) uses only about 1% of fuel potentially available in natural uranium; (2) generates plutonium and other higher actinides, primarily Pu-239 from neutron capture on U-238 plus two beta decays, which creates a risk for proliferation of nuclear weapons; and (3) produces high-level waste that is difficult to dispose of because of an awkward mixture of short-lived radioactivities (30-year and less) and long-lived radioactivities (24,000 years and more).

Proposals have been made to convert from a "uranium economy" to a "plutonium economy" through the separation of fission products from the actinides for easier disposal, recycling of the plutonium and minor actinides as fuel to replace the once-through cycle, and enhanced breeding of the fissile Pu-239 from the fertile U-238 using solid fueled fast breeders cooled by liquid metals. These proposals, however, raise environmental, safety, and security concerns, as well as issues of high financial costs.

Molten-salt reactors (MSRs) offer an attractive alternative to the nuclear option for power generation. Because the fuel as well as the coolant is in a liquid rather than a solid state, chemical separation of fission products from fissiles and fertiles can be done on-site to achieve virtually 100% burn-up. This obviates multiple back-and-forth transports of nuclear materials from nuclear power plants to reprocessing and pre-fabrication centers that otherwise occur with the conventional recycle strategy. Moreover, substituting Th-232 for U-238 as the fertile stock for breeding into U-233 rather than Pu-239 simplifies the problem of disposal of high-level nuclear waste, thereby greatly reducing both volume and time that such material needs to be stored in a repository before radiation drops below background levels.

Neutron irradiation of Th-232 produces virtually no plutonium or heavier actinides, closing that particular path to proliferation of nuclear weapons. Moreover, if Th-232 is uninterruptedly irradiated over a period of one year or longer, there is sufficient U-232 generated along with the U-233 as to create a strong deterrent against nuclear weapons production. As part of its decay chain, U-232 has strong gamma emission that makes detection of its presence easy. Additionally, the strong gamma emission interferes with any electronic mechanisms associated with a weapon.

The MSRs also have features that promote inherent passive safety. For example, the features include (1) thermal expansion of fuel out of a reactor core when fission reactions run too fast; (2) drainage of fuel into sub-critical holding tanks through melting of freeze plugs if the fuel salt gets extremely hot; (3) inward instead of outward blowing of leaking radioactive gases because of low vapor pressure of molten salts; and (4) immobilization of radioactive fuel or blanket through solidification of the molten salts if they should somehow escape from their primary or secondary containment vessels or piping.

The MSRs, however, may raise issues of chemical corrosion of containers and separation of fission products from fissile and fertile elements dissolved in the fuel and blanket salts. Because many of the fission products from the former behave similarly to thorium in the latter, a simple approach is to keep separate the uranium/plutonium fuel and thorium breed-stock in a two-fluid scheme as part of the overall reactor design.

Early systems used single fluid designs that are graphite moderated. Recent studies indicate that such designs may be unstable to unanticipated large excursions to high temperatures that enhance the capture of neutrons by U-233 relative to those by Th-232. Two-fluid MSRs, however, present significantly greater challenges for "plumbing" than single-fluid designs. This tension between chemical complexity/simplicity and plumbing simplicity/complexity has existed since the earliest discussions on building of a molten-salt breeder reactor.

BRIEF SUMMARY

In a two-fluid MSR, a graphite core is heated by a fuel salt and cooled by a blanket salt to a temperature intermediate between these two salts. Proper design ensures that the graphite cannot become hot enough for the destabilizing effect to operate without first triggering either the dumping of the fuel salt out of the reactor vessel or the vaporization of portions of the fuel salt, which will cause the fuel salt to expand out of the core, thereby shutting down the reactor.

In one form, the present invention features a reactor vessel includes a plenum and a reactor core with first and second sets of channels. A blanket salt flows through the first set of channels, and a fuel salt flows through the second set of channels. The plenum receives the blanket salt from the first set of channels. The blanket salt provides a breed-stock for a fission reaction in the fuel salt and transfers heat generated by the fission reaction without mixing with the fuel salt.

Further features and advantages of the invention will become apparent from the following description and from the claims.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale. Moreover, in the figures, like reference numerals designate corresponding parts throughout the views. In the drawings:

FIG. 5b is a bottom view of the module of FIG. 5a; and

DETAILED DESCRIPTION

The following description is merely exemplary in nature and is in no way intended to limit the present invention, its application, or uses. It should also be understood that steps within a method may be executed in different order without altering the principles of the invention.

Figure 1:
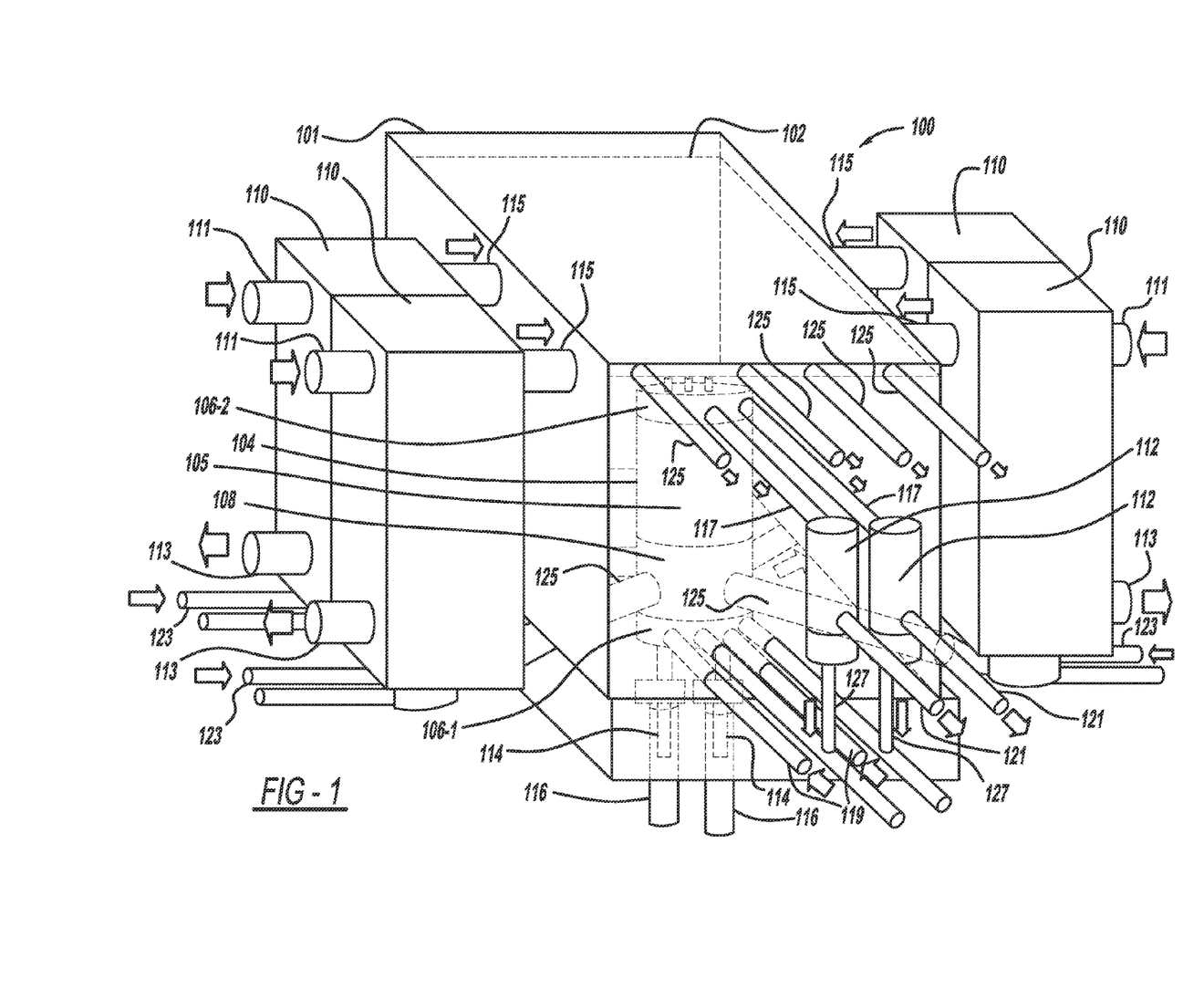
FIG. 1 is a schematic of a molten-salt reactor in accordance with an embodiment of the present invention.
Figure 2:
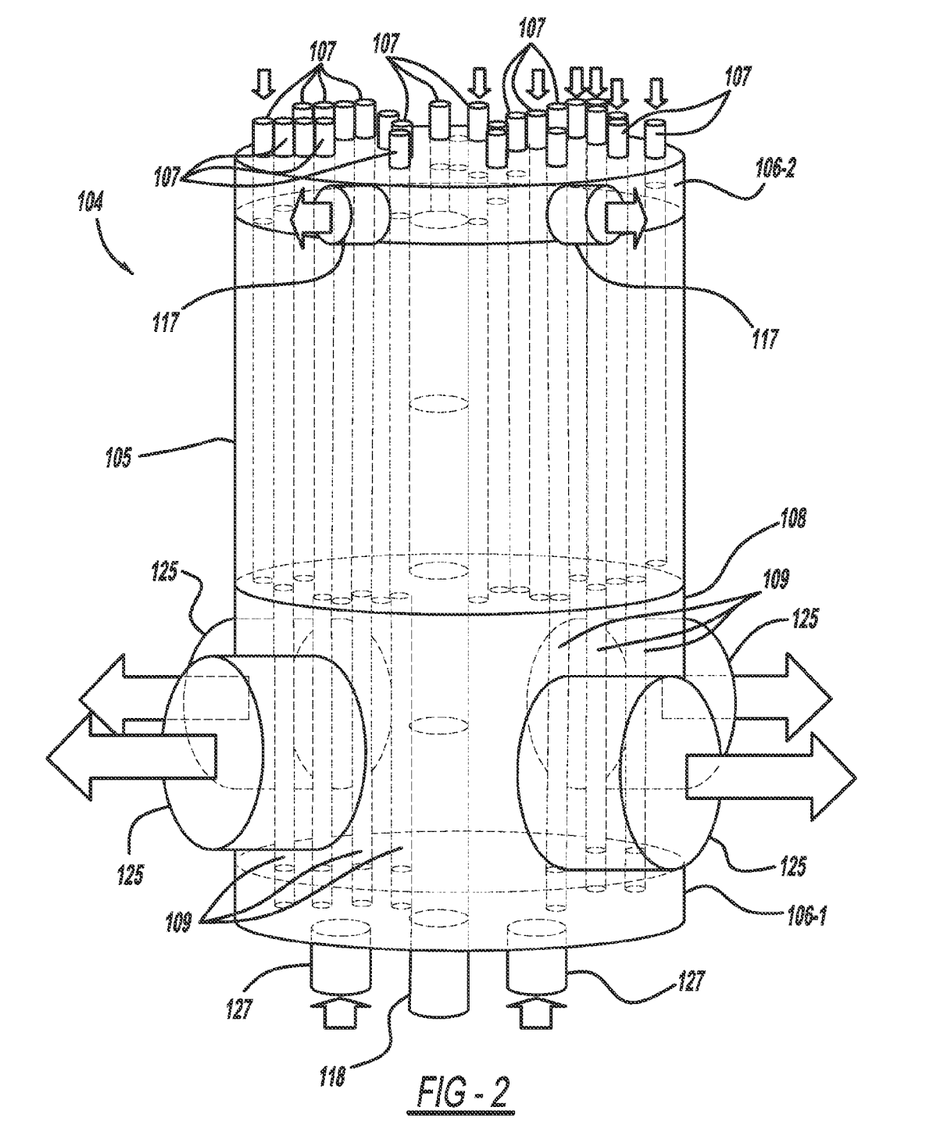
FIG. 2 is a schematic of a reactor vessel of the reactor of FIG. 1.

Referring now to FIGS. 1 and 2, a two-fluid molten salt reactor embodying the principles of the present invention is illustrated therein and designated as 100 (hereinafter reactor 100). The reactor 100 includes a large fluid pool of a blanket salt 102 and a reactor vessel 104 with a reactor core 105, all which are contained in an enclosure 101. The reactor core 105 may include a moderating core and may be made of metal, graphite, carbon-carbon composite, or some other suitable substance. Reactor cores with little carbon in them would have a near-fast or epithermal neutron spectrum. Reactor cores with considerable carbon in them would have a near-thermal neutron spectrum. The pool of blanket salt 102 surrounds and circulates through the reactor core 105.

As described in greater detail below, the core 105 has respective channels through which the blanket salt and a fluid fuel salt flow without mixing with each other. A set of extension tubes extend from the channels in the core 105 and through a plenum such that the blanket salt flows from the pool through these extension tubes into the respective channels in the core 105. Conversely, the reactor vessel 104 also includes another set of extension tubes and plenums through which the fuel salt flows remain closed to the pool 102. Accordingly, the blanket salt does not mix with the fuel salt. In some implementations, the fuel salt may carry plutonium and minor actinides (in case of a Pu-239 burner) or uranium (in case of a U-233 or U-235 burner), or any combination thereof.

In addition to keeping the blanket salt separate from the fuel salt, the combination of the reactor core 105 and the surrounding pool 102 allows the heat of the fission reaction in the fuel salt to be transferred to the blanket salt. Thus, the blanket salt plays a dual role as both breed-stock and coolant.

In a particular arrangement shown in FIG. 2, fuel salt plenums 106-1, 106-2 (collectively fuel salt plenums 106) are located at the top and bottom of the reactor vessel 104. The fuel salt plenums 106 distribute fuel to, and collect fuel from, channels in the core 105 made of a moderating medium such as metal, graphite, carbon-carbon composite, or some other appropriate substance. The blanket salt, acting as both a coolant and a breed-stock for new fuel, flows into other channels of the core 105 from the pool 102 through a set of extension tubes 107 that thread through the upper fuel salt plenum 106-2. Note that the number of extension tubes 107 may be greater than or less than the number of extension tubes 107 shown in FIG. 2. That is, any suitable number of extension tubes 107 may be employed depending on the application of the reactor 100.

The blanket salt is collected in its own blanket salt plenum 108. The blanket salt plenum 108 distributes this molten salt to a number of secondary heat exchangers 110. Although four secondary heat exchangers 110 are shown, any other suitable number of heat exchangers may be employed. The secondary heat exchangers 110 carry heat via inlet pipes 111 and exit pipes 113 to turbines that may be associated with generation of electricity. Alternatively or additionally, the secondary heat exchangers 110 carry heat via the pipes 111 and 113 to plants that use the heat to process various materials.

After the secondary heat exchange, the blanket salt returns to the top of the pool 102 through an appropriate set of pipes 115. Pumps cause the fuel salt to flow through a set of pipes 117 into a pair of pump bowls 112 located outside of the pool 102 and through a set of pipes 127 from the pair of pump bowls 112. Although two pump bowls 112 are shown, the number of the pump bowls 112 may vary depending on the use of the reactor 100.

Occasionally, the fuel salt may get extremely hot. To minimize risk of harm, a pair of frozen salt plugs 114 is provided at the bottom of the reactor 100. When the fuel salt gets extremely hot, the frozen salt plugs 114 melt and open alternate fuel salt paths 116 to emergency dump tanks. Although only two alternate fuel salt paths 116 are shown, the actual number of alternate fuel salt paths 116 employed may vary.

Helium gas bubbles are passed through the system through a set of inlet pipes or lines 119 to capture volatile fission-product gases. The volatile fission-product gases are removed from an enclosed space above the pump bowls 112 by exit helium lines 121. A similar helium-gas-based system includes inlet lines 123 and exit lines 125 to purge gases from the top of the pool 102 in which the core 105 in immersed. The fuel salt can also be drained through a set of pipes 120 that lead from below the pump bowls 112 to a processing plant where the dissolved fission products are removed periodically, for example, every month.

Although the pool 102 is shown in FIG. 1 as a rectangular parallelepiped, other shapes are possible as discussed below. Additionally, a facing of the completely enclosed pool 102 is resistant to chemical attack by molten salts. In some implementations, instead of the facing bearing full containment load, the facing may be backed by high-strength structural members. For example, the high-strength structural members may include reinforced concrete embedded with neutron absorbers.

Turning now in particular to FIG. 2, the core 105 is arranged so that the fuel salt circuit is closed to the pool 102 while the blanket salt is open to the pool. A central graphite control rod 118 is shown in a half-inserted position for illustrative purposes. In some implementations, zero or more than one control rod may be employed. Further, channels containing injectable neutron-absorbent salt may be optionally employed as well.

The tubes 107, made of metal alloy or carbon-carbon composites, or some other material, draw in the blanket salt from the pool 102. The tubes 107 thread through the top fuel salt plenum 106-2 and feed the blanket salt channels that are drilled or otherwise created in the core 105 that may be solid and may be made of moderating material. These channels open into the blanket salt plenum 108 which distributes the blanket salt (that is, the coolant and breed-stock) to a number of pipes 125 that lead to the secondary heat exchangers 110. Although four pipes leading to the four secondary heat exchangers 110 are shown, any suitable number may be employed.

The fuel salt enters the bottom fuel salt plenum 106-1 through a set of pipes 127 and flows into respective channels in the core 105, possibly along serpentine paths to increase the Reynolds number of the flow, through a set of extension tubes 109 that extend through the blanket-salt plenum 108 and to the top fuel salt plenum 106-2. The fuel salt exits the top fuel salt plenum 106-2 through a set of pipes 129.

Note that the fuel salt plenums 106 are optional. Instead, tubing from the fuel salt channels can connect directly to the fuel salt pump bowls 112. Although the core 105 is shown as a monolithic cylinder, in some implementations, the core 105 may be constructed of modular blocks. When the core 105 is constructed from modular blocks, the fuel salt plenums 106, if any, may feed and withdraw fuel salt individually from separate blocks, collectively from a complete set of blocks, or any combination thereof.

Occasionally, cracks may develop in the core 105 because of radiation damage or external stresses. When cracks develop, the pressures of the operating state are arranged so that the blanket salt always pushes into the volume previously occupied by the fuel salt. This arrangement prevents runaway power surges from occurring because of leaks in the core 105.

Many other safety/security features are intrinsic to the core 105 and pool 102 combination. Independent of the many possible choices for carrier salts and regardless of whether the system is used for plutonium/actinide burning or U-233/U-235 burning, a non-exhaustive list of the safety/security features follows.

A large reservoir of the blanket salt dilutes the fuel salt to a sub-critical state when an event, for example, earthquakes or sabotage, causes the fuel salt to escape from the reactor core 105 into the pool 102. A neutron "reflector" and "moderator" role for the salt medium of the pool 102 significantly reduces critical mass and critical inventory of fissile material needed to power the reactor 100. A solvent for bred U-233 (in the form of a fluoride or chloride) sufficiently large in volume ensures impracticality of the extraction of U-233, or the precursor Pa-233, if attempted on a time scale much shorter than one year.

A mechanical structure in the form of reinforced concrete or other strong building material impregnated with neutron absorbing elements backs up non-structural pool-facing made of an appropriate metallic alloy or carbon-based compounds and constrains large volume of corrosive molten salt in the pool 102. A dense liquid medium in which an immersed reactor core 105 is formally buoyant (unless ballast is added to it) offers possibilities for reducing gravitational loads and thermal stresses on a properly designed reactor vessel 104 and associated piping.

A thermal reservoir with a large heat capacity can buffer anomalous temperature excursions of the core 105 and can generate back-up electric power when emergencies shut down electric power from the grid. An absorbing medium prevents most neutrons escaping from the core 105 into the pool 102 from hitting the pool walls and beyond, thereby improving the breeding ratio for new fuel in the blanket salt as well as minimizing creation of low-level structural waste.

A core environment that promotes thermalization of fission neutrons, significantly lowering critical mass and critical inventory for fissiles relative to other designs, and adding to passive reactor safety. A larger ratio of Th-232 to U-233 present in the core of a two-fluid MSR compared to a single-fluid MSR makes resonance stabilization through Doppler broadening (enhancing neutron capture by Th-232 relative to U-233) more effective as a mechanism of passive safety. Additionally, the core environment decreases the power density and mean thermal energy of neutrons bombarding the graphite (if any) in the core 105, thereby increasing its lifetime against radiation damage. In the above arrangement, as well as those described below, the materials that touch the molten salt are typically made of Hastelloy N or carbon/carbon composites or some other material that is resistant to chemical corrosion by molten fluoride or chloride salts.

Figure 3A:
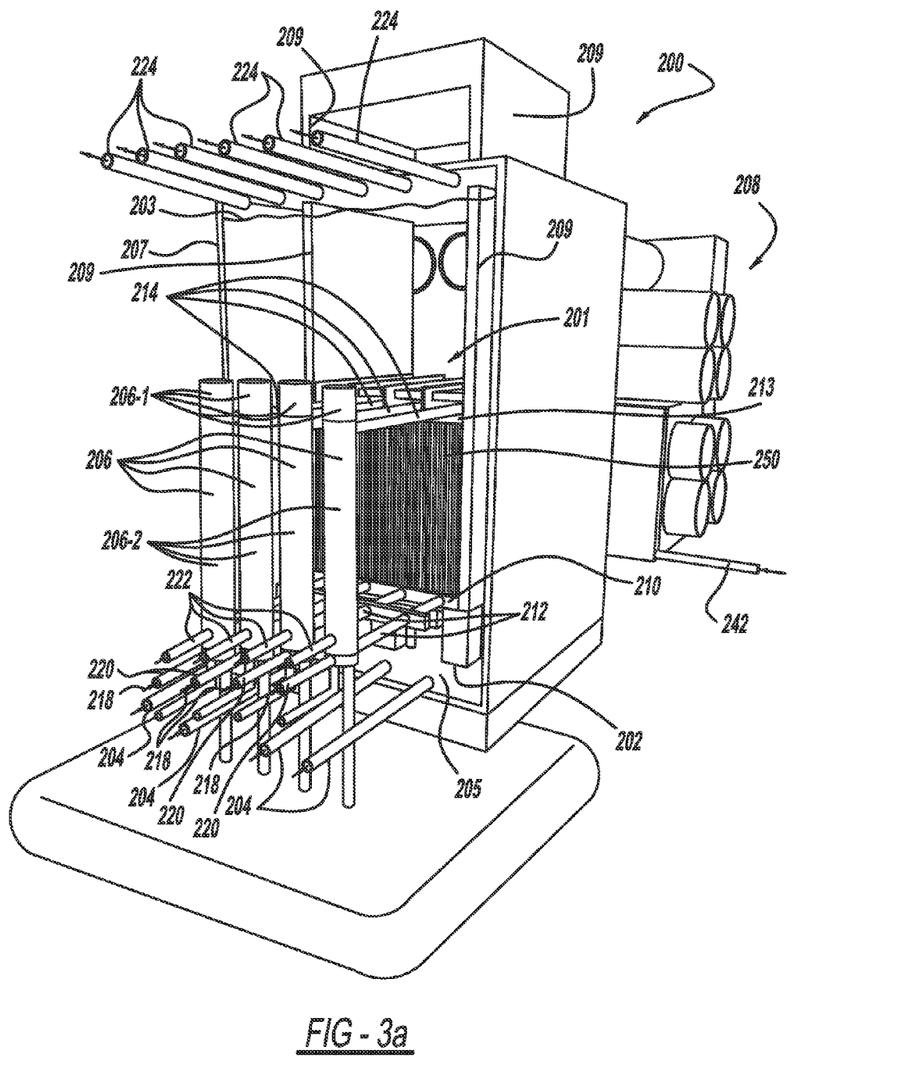
FIG. 3a is a schematic of a molten-salt reactor in accordance with another embodiment of the invention.
Figure 3B:
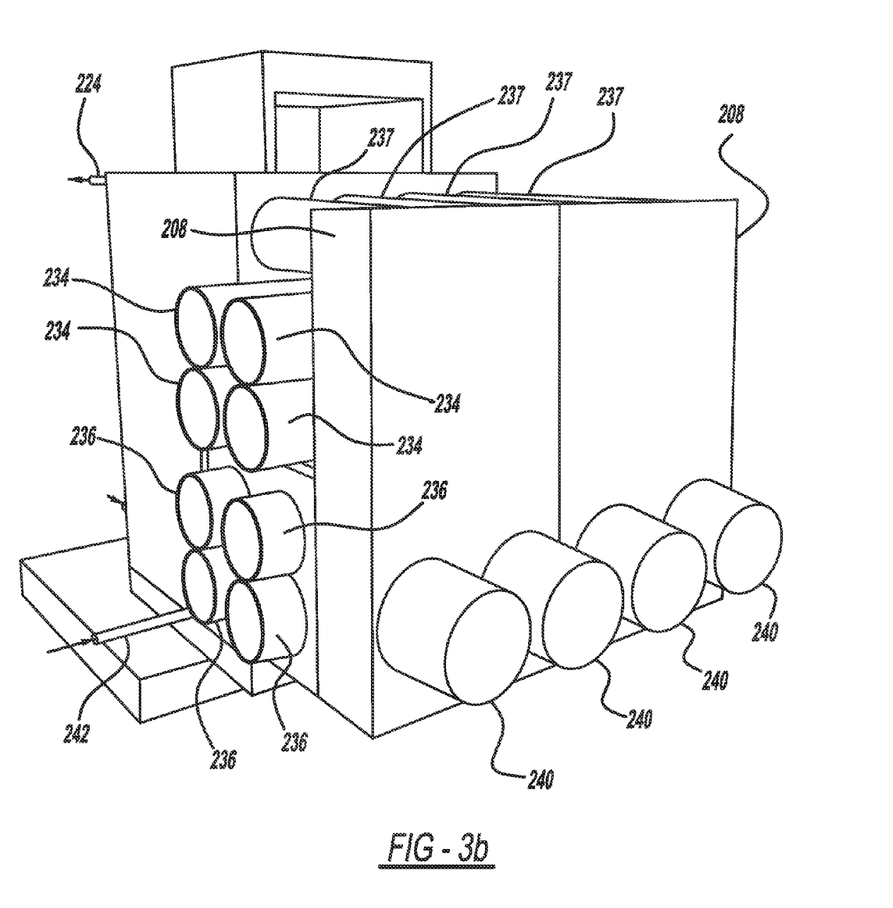
FIG. 3b is a rear view of the reactor of FIG. 3b.

Referring now to FIGS. 3a and 3b, there is shown another two-fluid molten-salt reactor 200 (reactor 200) in accordance with the invention. The reactor 200 includes a reactor vessel 201 that sits above a pedestal 202. The reactor vessel 200 is immersed in a pool 203 contained in an enclosure 207. The pedestal 202 has a tetrahedron (or other 3-dimensional shape) bottom to avoid the accumulation there of helium bubbles fed into the bottom of the pool through a set of pipes 204 that lead into a porous floor mat 205. The reactor 200 uses a pool of blanket salt to which the reactor vessel is open and to which the fuel salt is closed to simplify the compartmentalization of the two salts.

Tiles that are resistant to molten salt corrosion provide facing for thick reinforced concrete walls, floor, and ceiling to enclose the pool and separate the pool from a set of pump bowls 206 and a pair of heat exchangers 208. A set of drives 206-1 for the propellers with long shafts extending through the respective bodies 206-2 of the pump bowls 206 circulate the fuel salt through the reactor. For clarity, the front face of the pool is left out of the drawing to show the reactor vessel 201 and associated plumbing inside the pool, which is otherwise sealed to prevent the escape of radioactive gases and radiation. This tomb-like structure adds a layer of containment against nuclear accidents.

Optional graphite control rods enter the arms of the reactor support structure 209 from below; whereas shutdown rods drop from above during scrams. The drives for the shutdown rod are contained in the box above the pool that is part of the support structure 209, which also serves the purpose of holding down the reactor vessel that would otherwise be buoyant in the pool 203. A frozen salt plug normally blocks the downward passage of fuel salt leading into the reactor vessel through each of a set of pipes coming from the bottom of pump bowls 206 and into the front fuel-salt plenums. The four pump bowls 206 are shown for each segment of a reactor core that is assembled modularly to achieve criticality, but the number can be smaller or larger depending on desired power levels and other considerations. If the fuel salt gets too hot and melts the refrigerated plugs, the fuel salt drains into the emergency holding tank. A door to the pool at the left-hand side allows access to, and replacement of, the reactor vessel if necessary.

A set of plenums 210 at the bottom of the reactor vessel 201 collect fuel salt from a set of four pipes 212 and distribute fuel salt to vertical fuel salt channels in a graphite reactor core 250 without mixing fuel and blanket salts. The fuel salt warms as it passes via serpentine paths through the reactor core 250 until the heated fuel salt exits from a plenum 213 at the top of the reactor vessel and circulates back to the four pump bowls 206 through a set of pipes 214. The fuel salt can also be drained through a set of pipes 218 that lead from below the pump bowls 206 to a processing plant where the dissolved fission products are removed every month. Fissiles are added as needed to keep the reactor at a safe operating temperature, displacing a bit of the helium gas at the top of a pump bowl.

To purge the fuel salt of gaseous fission products (such as, for example, Xe-135), high pressure helium gas enters at the bottom of the pump bowls 206 through a set of pipes 220, bubbles through the reactor 200, exits at low pressure at the top of the pump bowls 206 through a set of pipes 222, and goes to a gas-processing unit where radioactive components are bottled for storage. A similar helium-gas-based system of exit lines 224 purges gases from the top of the pool in which the reactor vessel 201 is immersed.

Referring in particular to FIG. 3b, the pair of secondary heat exchangers 208 is shown at the back of the reactor 200 in greater detail. Each secondary heat exchanger is provided with four inlet pipes 234 and four exit pipes 236 for the circulation of a fluid, such as, for example, a non-radioactive tertiary salt. Accordingly, the pipes 234 and 236 for the secondary heat exchanger 208 on the left of FIG. 3b lead to the left, and the pipes for the pipes for the secondary heat exchanger 208 on the right of FIG. 3b lead to the right. A set of four motors 240 attached to the backs of the heat exchangers 208 pull the pool salt through the reactor vessel 201 and the heat exchangers 208, and, after secondary heat exchange with the heat exchangers 208, propel the returning blanket salt to the top of the pool through a set of pipes 237. Again, the number pipes and motors are merely illustrative.

Cool pool salt is drawn into the reactor core 250 as blanket salt through horizontal channels in the reactor core. Within the pool, thermal convection mixes the blanket salt. The blanket salt receives heat from the fuel salt in the vessel, collects in a back plenum 254 (see FIG. 4) before being distributed by a set of sixteen pipes into the secondary heat exchangers 208 that transfers the thermal power to the tertiary salt. The circulating tertiary salt enters the secondary heat exchangers 208 through the inlet pipes 234 and exit through the pipes 236 to heat a working gas or fluid that drives turbines generating electricity in a structure. The number of pipes (sixteen inlet pipes and exit pipes) and heat exchangers are again chosen for purposes of illustration; these numbers may be varied according to different power requirements and specifications.

Within the reactor 200 (as well as the reactor 100) neutron irradiation from the reactor transforms the Th-232 in the pool salt into U-233. At regular intervals, the pool salt undergoes fluorination for the removal of U-232, U-233, U-234, U-235 as $UF_6$. Other chemical or physical processes can be substituted for the extraction of the bred uranium. Neutron-induced fission of the bred U-233 produces small amounts of gases above the pool. For the reactor 200, an entrance pipe 242 and the exit pipes 224 provide helium lines to purge this gas of radioactive vapor.

Figure 4:
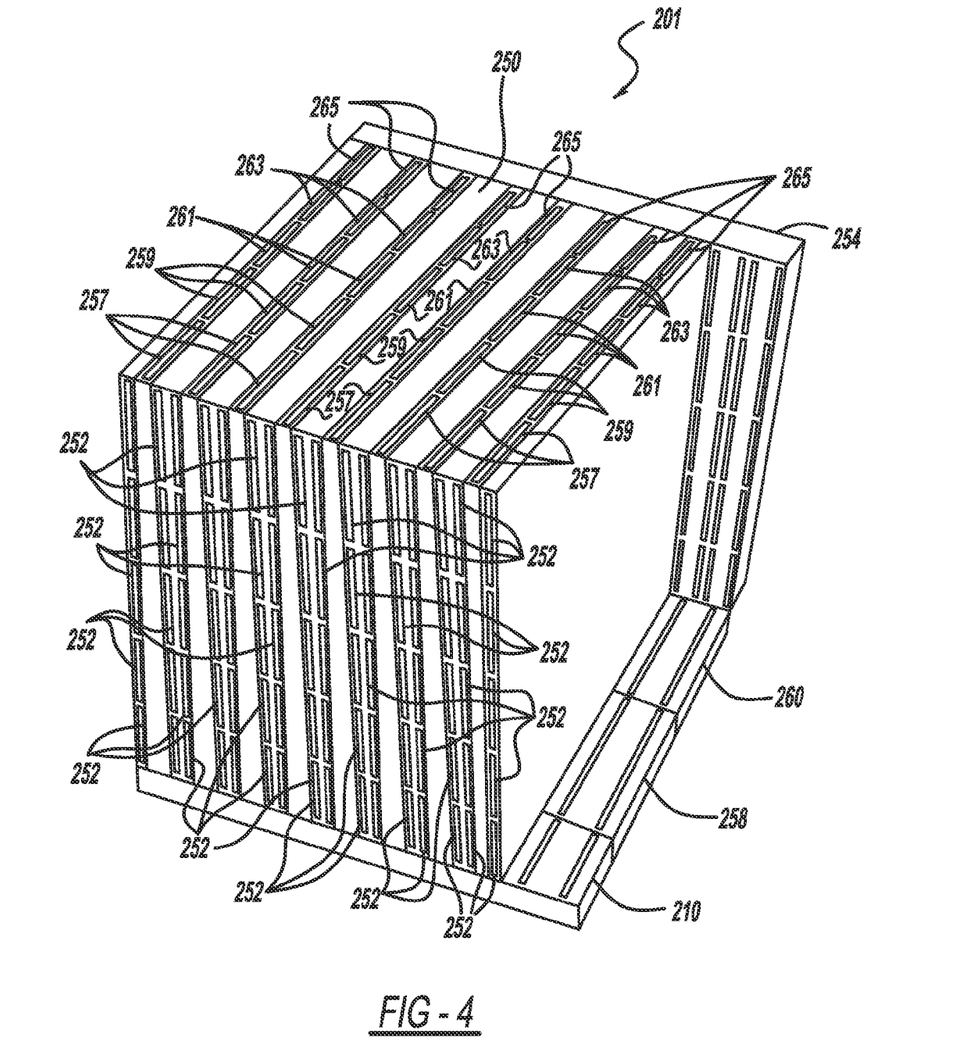
FIG. 4 is a schematic of a reactor vessel of the reactor of FIGS. 3a and 3b.

Referring now to FIG. 4, the reactor vessel 201 is shown in greater detail. Ducts or channels within the reactor core 250 carry the blanket salt entering from a set of slots 252 from the front of the reactor vessel 201 to the plenum 254 at the back of the reactor vessel. The plenum 210 at the bottom of the reactor vessel 201 feeds a set of upward ducts or channels 257 in the reactor core 250 with the fuel salt; a slab 258 adjacent to the plenum 210 directs the fuel salt from a set of downward ducts or channels 259 in the reactor core 250 to another set of upward ducts or channels 261 in the reactor core; and another slab 260 adjacent to the slab 258 directs the fuel salt from another set of downward ducts or channels 263 in the reactor core 250 to another set of upward ducts or channels 265 in the reactor core. The plenum 210 opens to the first fuel-salt ducts of the entire stack of fuel-salt panels and is thick enough to accommodate pipes of a large inner diameter entering from the front. The slabs 258 and 260 are solid except for the connecting troughs.

The complementary top plenum 213 (FIG. 3a) directs the fuel salt from the set of upward ducts or channels 257 to the set of downward ducts or channels 259; a top slab adjacent to the plenum 213 in the middle directs the fuel salt from the set of upward ducts or channels 261 to the set of downward ducts or channels 263; and yet another top slab near the back of the reactor vessel 201 directs the fuel salt from the set of upward ducts or channels 265 into exit pipes at the top. As described elsewhere, the specific number of ducts or channels and plenums are for illustrative purposes; other number of ducts or channels and plenums may be employed for a particular application.

Figure 5A:
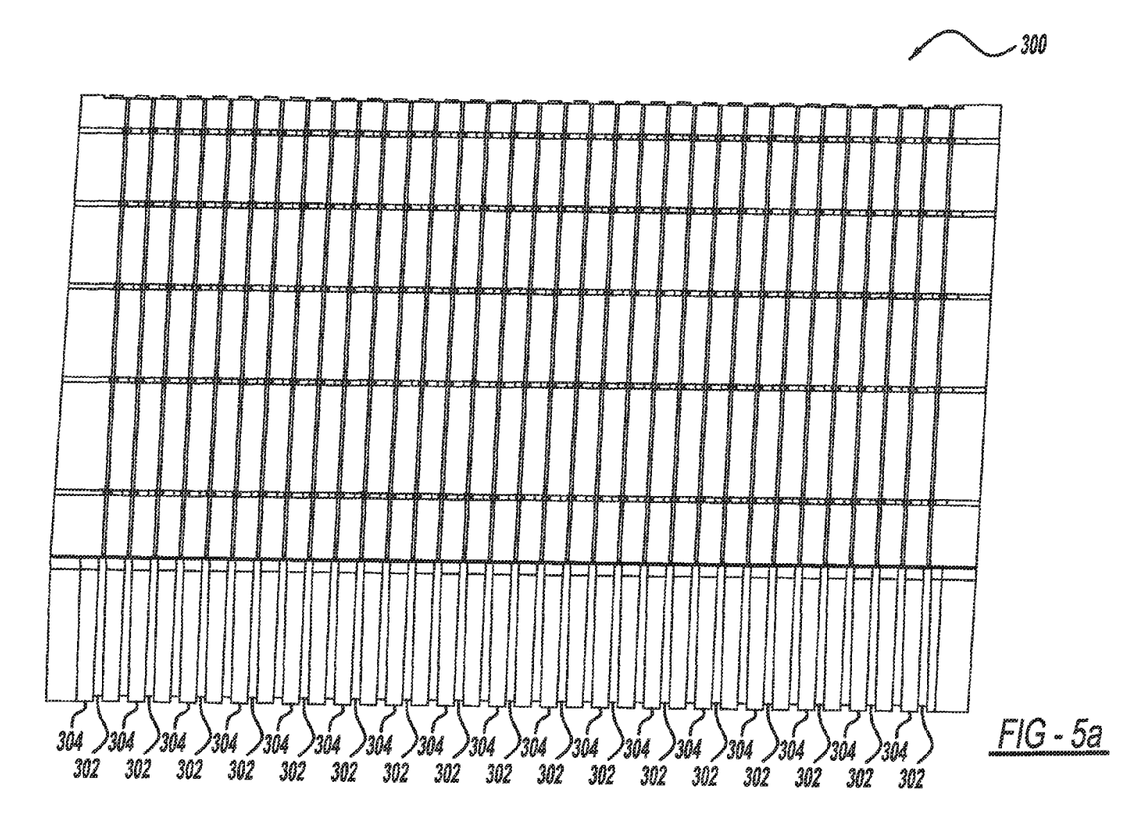
FIG. 5a is a schematic of a module for an emergency dump tank in accordance with yet another embodiment of the invention.

FIG. 5a is a top view of a module 300 for an emergency dump tank that can be employed with the aforementioned reactors in particular implementations. The dump tank has a sufficient number of modules 300 to hold all the fuel salt in the system. An entrance plenum is at the top of the module 300. Fuel salt resides in a set of ducts 302, and cooling air flows through the horizontal channels 304.

Figure 5B:
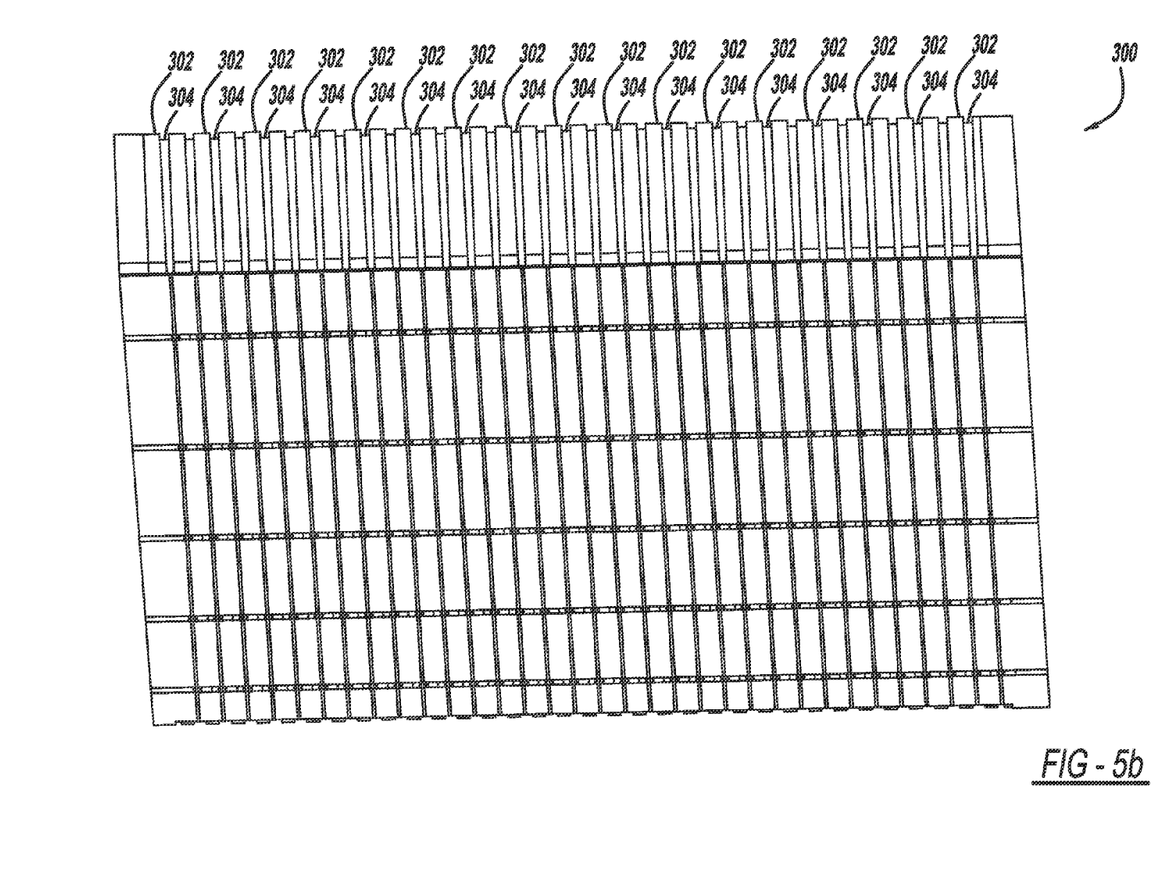

FIG. 5b is a bottom view of the module 300. The lowest layer has five cross canals (although the number of cross channels may be greater than or less than five) that connect the bottoms of the salt ducts 302 to make the fuel salt settle to a common level in the dump tank. A plate resides under the canal system, below which is another enclosed space containing flowing air to cool the salt in the cross canals and the bottom of the ducts 302.

In some implementations, the dump tank with modules 300 removes decay heat from radioactive fission products in the fuel salt by air-cooling. Since air is an omnipresent substance, as long as emergency electricity is available to drive fans that are redundant in their overall capacity, dumped fuel salt cannot overheat. For the dump tank, the same principle of crossed channels are employed as for the reactor vessel 201 and the secondary heat exchangers 208 to transfer heat from the hot substance (stationary fuel salt in vertical channels) to the coolant (flowing air in adjacent horizontal channels) in the dump tank. Because the fuel salt is stationary, there are enough channels to hold all the fuel salt in the system, and each channel has a narrow enough width to remove through thermal conduction the decay heat generated in its volume of fuel salt without overheating the container. The fans operate at variable speed so that the fuel salt is kept in a molten state, neither over-heating nor over-cooling, which makes it easier to transfer the fuel salt back to the reactor when the emergency is over. Within the dump tank the fuel salt is very subcritical because of the geometry of the dump tank and its lack of strong moderators.

In the unlikely event that all emergency cooling systems fail, say, through an act of deliberate sabotage, the system operates at a low enough peak power so that the associated decay heat (at maximum, of about 6.5% of peak power) can be radiated away by blackbody thermal radiation from the exterior surface of a double-shelled dome, after taking into account the passage of time required to heat the dome and its interior to a maximum acceptable temperature of about 400° C., below which the reinforced concrete will recover about 90% of its original strength after a year. These measures make the entire system inherently safe, that is, no conceivable accident or act of deliberate sabotage can lead to the release of massive amounts of radioactivity into the surroundings.

The size of the pool can be configured relative to the operating power of the reactor so that no chemical processing of the blanket salt, apart from helium bubbling to remove Xe-135 and other noble fission gases, and annual fluoridation to recover bred U-233, need ever occur for the anticipated lifetime of the plant (approximately 60 years). In particular, the pool is large enough so that protactinium-233, the immediate beta-decay product of Th-233 arising from neutron capture by Th-232, exists in dilute enough concentrations in the pool to reduce the probability (mean less than about V %) of capturing another neutron before decaying to U-233. Exposure of the blanket salt to neutron irradiation for a about year before uranium extraction, guarantees sufficient levels of the co-production of U-232. In its decay chain, U-232 is a gamma-emitter and provides a strong deterrent against nuclear weapons proliferation in the fuel cycle. These measures in a two-fluid molten-salt reactor therefore give a proliferation resistant method for the separate chemical processing of the fuel salt (carried out, for example, monthly to remove fission products) and the blanket salt (carried out, for example, yearly to extract the bred uranium). In the process, a breeding ratio greater than unity and a strategy for achieving sustainable nuclear energy generation for millennia is produced.

In a particular implementation, the reactor vessel 201 is made of carbon-carbon composite with 140 fuel salt channels of approximate inner dimensions 0.5 cm×45 cm×240 cm and 280 blanket salt channels of approximate inner dimensions 0.7 cm×45.2 cm×240 cm. In this implementation, the fuel salt containing U-233 as fuel (at a molar concentration of about 2.5%) is pumped through its channels at a mean speed of about 1.45 m/s and the blanket salt containing Th-232 (at a molar concentration of 22%) is pumped through its channels at a mean speed of about 2.22 m/s to achieve a thermal operating power of about 400 MWt. Depending on the thermal properties of the carbon/carbon composite used to construct the reactor vessel, the resulting temperatures within the reactor vessel is given approximately by the following table when we use eutectic $NaF-BeF_2$ as the carrier salt for fuel and blanket:

| Fuel salt (enter) | Fuel salt (exit) | C/C (hottest, next to fuel) | C/C (next to blanket facing fuel) | C/C (betw two blankets) | Blanket salt (exit) | Blanket/pool salt (enter) |
|---|---|---|---|---|---|---|
| 1,113° C. | 1,087° C. | 1,033° C. | 873° C. | 717° C. | 750° C. | 675° C. |

The pressures within the channels are those given by hydrostatic equilibrium, that is, by the balance against the gravitational field of the Earth, after taking into account the mean pressure gradient needed to drive the turbulent molten salts through their channels:

$$|\nabla P| = f/D_e \rho v^2.$$

In the above, f is the friction coefficient, $\rho$ is the density of the molten salt, v is its mean speed in a channel, and $D_e$ is the equivalent diameter of a channel with a rectangular cross section when referenced to a circular pipe. For a rectangle with a long side a and a short side b, $D_e$ is given to within 2% accuracy by the formula, $$D_e = \left[\frac{2}{3} + \frac{11}{12}\alpha(1-\alpha)\right]D_h.$$

where $\alpha$ and $D_h$ are, respectively, the aspect ratio and hydraulic diameter:

$$\alpha \equiv \frac{b}{a}, \quad D_h \equiv \frac{2ab}{a+b}.$$

For b=0.5 cm and a=45 cm, $D_e$=0.6693 cm≡$D_f$, the equivalent diameter of fuel salt channels. For b=0.7 cm and a=45.2 cm, $D_e$=0.9384 cm≡$D_b$, the equivalent diameter of blanket salt channels.

The friction factor f is obtained empirically from the Reynolds number of the flow, $$Re \equiv \frac{\rho v D_e}{\mu},$$

where $\mu$ is the coefficient of shear viscosity of the molten salt. The correlation between f and Re used (via logarithmic interpolation) is summarized by the table:

| Re | f |
|---|---|
| 4000 | 0.009949 |
| $2.3 \times 10^4$ | 0.006261 |
| $1.1 \times 10^5$ | 0.004415 |
| $1.1 \times 10^6$ | 0.002866 |
| $2.0 \times 10^6$ | 0.002596 |
| $3.2 \times 10^6$ | 0.002403 |

There is enough pressure head from the pool salt that sits above the ceiling of the reactor vessel so that the pressures of the blanket salt are everywhere higher than the pressures of the adjacent fuel salt. This condition ensures that if leaks develop in the reactor vessel, the blanket salt will push into the fuel salt channels and displace fuel salt out of the reactor, shutting down the fission reactions. The opposite occurrence, that is, fuel salt pushing into blanket channels, would lead to a dangerous supercritical situation. The use of the static pressure head arising from the gravitational field of the Earth to obtain automatic sub-criticality is another example of the passive safety mechanisms in the aforementioned reactors 100 and 200.

The turbulent heat transfer in the pipes and ducts can be determined empirically. The basic quantity is the Nusselt number that measures the efficiency of (forced) turbulent convection relative to heat conduction that carries energy from the fluid (molten salt) at the center of a channel to the material walls bounding it. The Nusselt number Nu is related to the Reynolds number Re of the flow and the Prandtl number Pr of the fluid, $$Pr \equiv \frac{\mu c_P}{K},$$

where $c_P$ is the specific heat capacity of the fluid at constant pressure P, and K is its thermal conductivity. The empirical correlation among Nu, Re, and Pr, used by us has the expression (see Table 5.11 of Rohsenow et al. 1988):

$$Nu = \frac{(f/2)(Re-1000)Pr}{1+12.7(f/2)^{1/2}(Pr^{2/3}-1)},$$

where f is the friction factor given in terms of Re earlier. Once the Nusselt number is known, the mean temperature difference between the fluid (molten salt) and its bounding walls can be computed through the formula:

$$\Delta T = \frac{(\wp/V)D_e^2}{2 n_{hcw} Nu K},$$

where $\wp$ is the total power to be transferred in all channels of the fluid in question with a total volume V of channels, and $n_{hcw}$ is the effective number of heat-carrying walls in each channel. For example, for fuel salt when operating at peak power, then $\wp$ =400 MWt, V=140 (0.005 m)(0.45 m)(2.4 m), and $n_{hcw}$=2 because the heat generated by the fuel salt is carried to two walls that interface each fuel channel with surrounding blanket salt channels. On the other hand, blanket salt channels have only one fuel salt channel adjacent to them, so $n_{hcw}$ is 1 for them, except that there are slight corrections to this number of unity because of "influence factors" (see Table 5.28 of Rohsenow et al. 1988). The values for $\rho$, $c_P$, $\mu$, K for the appropriate molten-salt mixtures can be found as a function of temperature T in standard databases.

Finally, the heat is carried from a bounding wall of the fuel salt channel to a blanket salt channel by thermal conduction in the carbon-carbon (C/C) composite. A temperature gradient in the C/C composite is given by the application of Fourier's law:

$$\left|\frac{dT}{dx}\right| = \frac{(\wp/Nac)}{2K_{eff}},$$

where N=140 is the number of fuel-salt channels, a=0.45 m and c=2.4 m are the effective dimensions of the faces between fuel-salt and blanket-salt channels, and $K_{eff}$ is the effective thermal conductivity of the C/C composite. The material properties of C/C composites are not well-known as functions of the temperature and depend on the quality of the carbon fibers and carbon matrix used to make the C/C composite fabric that is the starting basis for the manufacture of reactor vessels, heat exchangers, as well as other components. A cost effective combination uses P30 carbon fibers bonded together with coal-tar pitch as the matrix (Ponslet et al. 2000). For the present calculations, the fit of the empirical law deduced from measurements of this material for a radiator part in the Earth Orbiter 1 spacecraft is given by the formula:

$$K_{eff} = 169(T/573K)^{-1/2} Wm^{-1}K^{-1}.$$

Similar calculations as performed for the reactor vessel when applied to the secondary heat exchanger yields the following estimates for the temperatures when the tertiary salt is chosen to be (natural) LiF—NaF—KF in the approximate molar proportions 46.5%:11.5%:42%:

| Molten salt in heat exchanger | Inlet temperature (heat exchanger) | Outlet temperature (heat exchanger) | Bounding C/C temperature |
|---|---|---|---|
| NaF—BeF$_2$ | 750° C. | 675° C. | 634° C. |
| LiF—NaF—KF | 520° C. | 538° C. | 580° C. |

As an example of the reactions that may occur in the above described reactors, the critical balance equation that expresses the chain reaction that occurs when there is barely a critical mass in the core of a reactor burning U-233 s fuel is:

$$\Upsilon_p + [n_{232}\overline{\sigma}_{cap}(232) + n_0\overline{\sigma}_{cap}(o)]\frac{D}{3} = (\nu_c - 1)n_{233}\overline{\sigma}_{fis}(233)\frac{D}{3}.$$

In the above equation, $n_{233}$, $n_{232}$, and $n_o$ are, respectively, the space averaged number densities of U-233, Th-232, and all other nuclides in the reactor core (associated with the fuel salt, carbon/carbon composite, fission products, etc.); $\overline{\sigma}_{fis}(233)$, $\overline{\sigma}_{cap}(232)$, and $\overline{\sigma}_{cap}(o)$ are the associated mean fission, neutron-capture cross sections, D≅2.4 m is the length associated with the sides of the cubical reactor core, and $\gamma_p$ is the mean transmission factor from the core to the pool. The quantity $\nu_c$ is the corrected number of neutrons released per fission of U-233 and equals, not the raw average value 2.49, but approximately 2.29 after the parasitic captures by the other isotopes of uranium and actinides are accounted for that are inevitably made as a byproduct of the neutron irradiation of Th-232 and U-233.

Mean cross-sections are computed as flux-weighted averages. Let F(x) be the dimensionless distribution function of neutrons with energy $\epsilon$, measured in dimensionless form by its ratio with (2/3 times) the thermal energy, kT, $$x \equiv \frac{\varepsilon}{kT},$$

where k is the Boltzmann constant, and T is the temperature of the ambient moderating medium. F(x) is normalized according to neutron number density:

$$\int_0^\infty F(x)x^{1/2}\,dx = 1.$$

Figure 6:
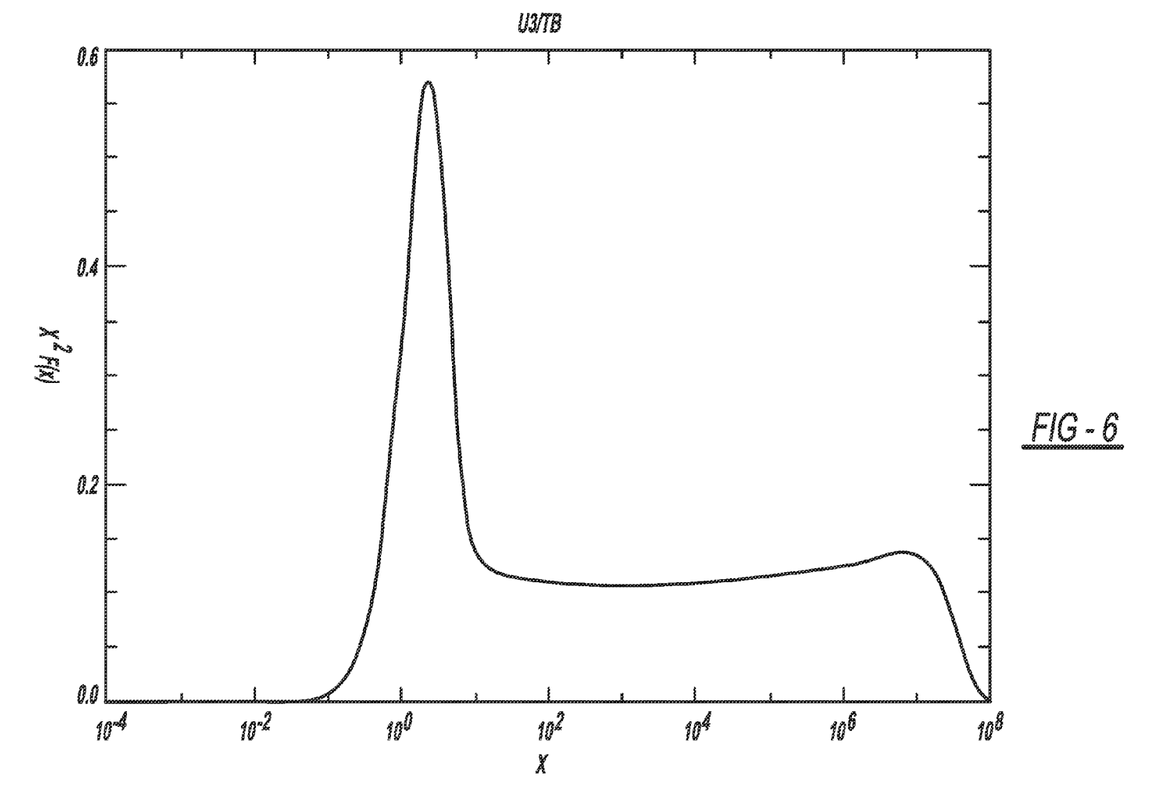
FIG. 6 shows a moderated distribution function of neutron number flux (with the effects of resonances excluded for clarity), where $x^2 F(x)$ is plotted on a linear scale against a dimensionless energy x on an exponential scale.

Then the dimensionless neutron flux is given as a number, $$\langle x^{1/2}\rangle \equiv \int_0^\infty F(x)x\,dx,$$

which is larger than $2/\sqrt{\pi}$=1.128 if the distribution function has a long tail of (epithermal) neutrons with energies above thermal values (see FIG. 6 for a computed example that does not take account of nuclear resonances). In terms of the dimensionless neutron distribution function, the mean of an energy dependent cross-section $\rho(\epsilon)$ is given by the definition:

$$\overline{\sigma} \equiv \frac{1}{\langle x^{1/2}\rangle}\int_0^\infty \sigma(xkT)F(x)x\,dx.$$

Lumped mean cross sections such as $\overline{\sigma}_{cap}(o)$ are computed as sums over the members i of the group:

$$\overline{\sigma}_{cap}(o) = \frac{1}{n}\sum_i n_i\overline{\sigma}_{cap}(i), \quad n \equiv \sum_i n_i.$$

FIG. 6 is an example of a neutron distribution function when nuclear resonances are ignored for a reactor that burns U-233 and breeds for the same from Th-232, with $x^2F(x)$ plotted on a linear scale against x on an exponential scale.

Because elastic collisions with nuclei in the pool salt act to partially "reflect" neutrons back into the core, the transmission factor can be appreciably smaller than unity. In the diffusion approximation for a large pool, the following expression can be derived:

$$\Upsilon_p = 2\left(\frac{\overline{\sigma}_{abs}}{3\overline{\sigma}_R}\right)_p^{1/2},$$

where the mean absorption cross-section of nuclides in the pool equals $$\bar{\sigma}_{abs} = \frac{1}{n}\sum_i n_i \bar{\sigma}_{cap}(i), \ n \equiv \sum_i n_i,$$

and the sum over i now includes all species of atomic nuclei in the pool. The subscript R in $\sigma_R$ refers to a "Rosseland" mean cross-section that is defined as a transmission mean:

$$\frac{1}{\sigma_R} \equiv \frac{1}{n}\sum_i n_i \int_0^\infty \frac{F(x)xdx}{[\sigma_{sca}(i) + \sigma_{cap}(i)]}.$$

For a pool salt consisting of a 22% molar concentration of Th-232 in eutectic NaF—BeF$_2$, $\gamma_p$=0.188, appreciably smaller than unity because the elastic scattering cross sections of Be-9, F-19, Na-23, and even Th-232 are large compared to their neutron-capture cross sections. Thus, the presence of the pool salt yields an appreciable reduction of the critical mass of the fuel needed in the reactor core to sustain a chain reaction. If there is a loss because of a coolant accident, that is, if the blanket salt were to drain from the pool for some unexpected reason, the increase of $\gamma_p$ to a value close to 2/$\sqrt{3}$=1.155 makes the resulting configuration sub-critical, that is, the reactor would automatically shut down even without operator intervention.

The average neutron excess $(v_c-1)$=1.29 given per fission of U-233 not needed to sustain the chain reaction in the core is split by three processes: escape to the pool, conversion of Th-232 to U-233 in the core, and parasitic captures by atomic nuclei in the core other than Th-232 and U-233. These three processes occur in the dimensionless rate ratios:

$$\Upsilon_p: \frac{1}{3}n_{232}\bar{\sigma}_{cap}(232)D: \frac{1}{3}n_o\bar{\sigma}_{cap}(o)D.$$

Requiring that an overall multiplicative factor makes the three individual terms sum to $(v_c-1)$=1.29, we are able to compute how many neutrons escape to the pool and how many nuclei of U-233 are made from Th-232 in the core per fission of U-233. When the pool is made large enough, almost every neutron that enters the pool is captured within the pool, rather than is absorbed by the outer pool walls, so the corresponding ratio of:

$$n_{232}\bar{\sigma}_{232} : n_o\bar{\sigma}_{cap}(o)$$

for the conditions in the pool yields how the neutrons that enter the pool are split into conversion of Th-232 into U-233 or are wasted in parasitic captures. Summing the numbers of U-233 created in the core and in the pool then yields the breeding ratio. Small corrections are made to account for the number of Pa-233 in steady state that capture an additional neutron before decaying into U-233, and for the incomplete removal of Xe-135 by the off-gas helium bubbling system. The latter requires experimental data before it can be estimated very accurately, but it is believed (Scott & Eatherly (1970)) that helium bubbles that occupy 0.5% of the volume of the fuel and blanket salts can keep the parasitic captures of Xe-135 to less than a 0.5% effect on the breeding ratio.

The resulting breeding ratio for a U-233 burner/Th-232 breeder is approximately 1.07. This value can be improved somewhat if instead of eutectic NaF—BeF$_2$, we use as the carrier for the fuel salt, eutectic $^7$LiF—BeF$_2$, where the minor isotope $^6$Li has been removed to the 0.005% level. On the other hand, if there are contaminants such as boron in the carbon/carbon composite used for the reactor vessel, they could eat into the theoretical breeding ratios. As long as the contamination is not so severe as to prevent even the chain reaction at the maximum allowable fuel concentration, operation of the reactor will quickly burn out the contaminants, with their large cross-sections for neutron capture transforming them to relatively benign nuclei (for example, $^{10}$B plus neutron giving $^7$Li plus alpha).

The continued production of minor actinides when one uses Pu-239 from spent LWR fuel implies that the conversion factor for Pu-239 into U-233 from breeding Th-232 is not as good. Calculations indicate that a conversion factor of 0.92 is perhaps as much as one can reasonably expect. The exact value for the conversion ratio is hard to pinpoint inasmuch as it is dependent on the nature of the light-water reactor from which the spent fuel is derived, as well as how long that spent fuel is stored before it is reprocessed for burning in a MSR actinide burner. Nevertheless, it is believed that conversion ratios are high enough so that a complete transformation to a Th-232/U-2333 fuel cycle can be made before 2050 if the construction of two-fluid molten-salt reactors is put on a fast track worldwide.

An advantage of a turbulent liquid-based fuel is that an inhomogeneous mixture of feedstock from a variety of sources (mostly LWRs) is automatically blended into a uniform fuel that would burn without hot spots or excessively large local neutron fluxes. Such hot spots are much harder to prevent with fuel that must be fabricated in a solid form, yielding yet another superiority of MSRs over conventional reactors.

The following references are incorporated herein by reference in their entirety:

MacPherson, H. G. 1985, The Molten Salt Adventure, Nuclear Science and Engineering, 90, 374-380.

Matheiu, L., Heuer, D., Brissot, R., Le Brun, C., Liatard, E., Loiseaux, J.-M., Meplan, O., Merle-Lucotte, Nuttin, A., Wilson, J. 2005, The Thorium Molten Salt Reactor Moving On from the MSBR, arXiv:nucl-ex/050600v1.

Rosenthal, M. W., Briggs, R. B., Kasten, P. R. 1967, Semiannual Progress Report for Period Ending Aug. 31, 1967, ORNL-4191, Atomic Energy Commission (USA).

Ponslet, E., Biehl, F., Romero, E. 2000, Carbon-Carbon Composite Closeout Frames for Space Qualified, Stable, High Thermal Conductivity Support Structures, Cytec Corp. Report 102021-0001.

Rohsenow, W. M., Hartnett, J. P., and Cho, Y. I. (editors) 1998, Handbook of Heat Transfer (New York: McGraw-Hill).

Scott, D., Eatherly, W. P. 1970, Graphite and Xenon Behavior and Their Influence on Molten Salt Reactor Design, Nuclear Science and Technology, 8, 179-189.

The broad teachings of the disclosure can be implemented in a variety of forms. Therefore, while this disclosure includes particular examples, the true scope of the disclosure should not be so limited since modifications will become apparent from the following claims.

What is claimed is:

1. An reactor vessel comprising:
   a reactor core having a first set of channels and a second set of channels, a blanket salt flowing through the first set of channels and a fuel salt flowing through the second set of channels without mixing with the blanket salt; and
   a plenum that receives the blanket salt from the first set of channels, the blanket salt providing a breed-stock for a fission reaction in the fuel salt, and the blanket salt conducting heat exchange with the fuel salt in the reactor core by transferring heat generated by the fission reaction in the fuel salt to the blanket salt, wherein the reactor core is configured to be immersed in a pool of blanket salt so that the first set of channels are open to and in fluid communication with the pool of blanket salt.

2. The reactor vessel of claim 1 wherein the blanket salt exits the plenum into the pool of blanket salt.

3. The reactor vessel of claim 1 further comprising a first fuel salt plenum that receives the fuel salt from the reactor core and directs the fuel salt out of the reactor vessel.

4. The reactor vessel of claim 3 further comprising a second fuel salt plenum that receives the fuel salt and directs the fuel salt into the reactor core.

5. The reactor vessel of claim 1 wherein the reactor core is made of metal, graphite, or carbon-carbon composite.

6. The reactor vessel of claim 1 wherein the reactor core has generally a cylindrical shape.

7. The reactor vessel of claim 1 wherein the reactor core has generally a cubical shape.

8. A two-fluid molten-salt reactor comprising:
an enclosure that includes a pool of blanket salt; and
a reactor vessel that is immersed in the pool of blanket salt, the reactor vessel including:
   a reactor core having a first set of channels and a second set of channels, the first set of channels being open to and in fluid communication with the pool of blanket salt, the blanket salt flowing through the first set of channels and a fuel salt flowing through the second set of channels without mixing with the blanket salt; and
   a plenum that receives the blanket salt from the first set of channels, the blanket salt providing a breed-stock for a fission reaction in the fuel salt, and the blanket salt conducting heat exchange with the fuel salt in the reactor core by transferring heat generated by the fission reaction in the fuel salt to the blanket salt.

9. The reactor of claim 8 wherein the blanket salt exits the plenum into the pool of blanket salt.

10. The reactor of claim 8 further comprising a first fuel salt plenum that receives the fuel salt from the reactor core and directs the fuel salt out of the reactor vessel.

11. The reactor of claim 10 further comprising a second fuel salt plenum that receives the fuel salt and directs the fuel salt into the reactor core.

12. The reactor of claim 8 wherein the reactor core is made of metal, graphite or carbon-carbon composite.

13. The reactor of claim 8 further comprising at least one pump bowl connected to the reactor vessel, the at least one pump bowl pumping fuel salt into the reactor core.

14. The reactor of claim 8 further comprising at least one secondary heat exchanger that receives heated blanket salt from the reactor vessel, transfers the heat from the blanket salt to a fluid without mixing the fluid with the blanket salt, the blanket salt being cooled by the transfer of heat to the fluid, and returns the cooled blanket salt to the pool of blanket salt.

15. The reactor of claim 14 wherein the fluid is a non-radioactive tertiary salt.

* * * * *